US008792059B2

(12) United States Patent
Kuciera et al.

(10) Patent No.: US 8,792,059 B2
(45) Date of Patent: Jul. 29, 2014

(54) CONTROL DEVICE FOR AUDIO-VISUAL DISPLAY

(75) Inventors: Joachim Kuciera, Placentia, CA (US); Kevin Paul Finnegan, Anaheim, CA (US); Kevin E. Nortrup, Fairland, IN (US)

(73) Assignee: Anacom Medtek, Anaheim, CA (US)

( * ) Notice: Subject to any disclaimer, the term of this patent is extended or adjusted under 35 U.S.C. 154(b) by 0 days.

(21) Appl. No.: 13/812,126

(22) PCT Filed: Jul. 26, 2011

(86) PCT No.: PCT/US2011/045399
§ 371 (c)(1),
(2), (4) Date: Jan. 24, 2013

(87) PCT Pub. No.: WO2012/018637
PCT Pub. Date: Feb. 9, 2012

(65) Prior Publication Data
US 2013/0229583 A1    Sep. 5, 2013

Related U.S. Application Data

(60) Provisional application No. 61/367,624, filed on Jul. 26, 2010.

(51) Int. Cl.
*H04N 5/44* (2011.01)
(52) U.S. Cl.
USPC ........... 348/734; 348/730; 348/733; 348/725; 348/738; 348/462; 348/376; 340/825.56; 340/825.57; 340/24; 455/181.1

(58) Field of Classification Search
USPC ......... 348/734, 730, 733, 725, 376, 738, 462; 340/825.56, 825.57, 24; 455/181.1
See application file for complete search history.

(56) References Cited

U.S. PATENT DOCUMENTS

| 7,142,256 B2 | 11/2006 | Stoner et al. | |
| 2003/0043302 A1* | 3/2003 | Stoner et al. | 348/734 |
| 2006/0217987 A1* | 9/2006 | Sowada et al. | 704/275 |
| 2008/0225008 A1* | 9/2008 | Madonna et al. | 345/173 |
| 2008/0252793 A1* | 10/2008 | Choi et al. | 348/734 |
| 2008/0300660 A1* | 12/2008 | John | 607/61 |
| 2009/0153288 A1* | 6/2009 | Hope et al. | 340/3.1 |
| 2009/0153289 A1* | 6/2009 | Hope et al. | 340/5.1 |
| 2009/0156251 A1* | 6/2009 | Cannistraro et al. | 455/557 |
| 2010/0146422 A1* | 6/2010 | Seong et al. | 715/765 |

* cited by examiner

*Primary Examiner* — Jefferey Harold
*Assistant Examiner* — Mustafizur Rahman
(74) *Attorney, Agent, or Firm* — Klein, O'Neill & Singh, LLP (57) ABSTRACT

A control device signals user inputs to an audio-video display. The control device may be configured as a pillow speaker and include a speaker for reproducing audio from the audio-video display. The control device is coupled to the audio-video display by wiring. Shared signals in the wiring are used to provide power to operate the control device and are used to signal the user inputs to the audio-video display. A touch panel is used to sense user inputs. The touch panel may be transparent with an underlay containing indicia of user-selectable commands located below the touch panel. The arrangement and selection of commands available to the user may be modified by changing the underlay.

12 Claims, 7 Drawing Sheets

CONTROL DEVICE FOR AUDIO-VISUAL DISPLAY

CROSS-REFERENCE TO RELATED APPLICATION

This application is a national phase filing, under 35 U.S.C. §371(c), of International Application No. PCT/US2011/045399, filed Jul. 26, 2011, the disclosure of which is incorporated herein by reference in its entirety. International Application No PCT/US2011/045399 claims priority under 35 U.S.C. Section 119(e) from U.S. Provisional Application No. 61/367,624, filed Jul. 26, 2010, the disclosure of which is incorporated herein by reference in its entirety.

BACKGROUND

This disclosure relates to systems and devices for controlling audiovisual displays, such as televisions. In a particular embodiment, this disclosure relates to systems employing control devices embodied in or configured as pillow speakers with touch-panel controls.

Television sets are often used as "infotainment" displays in institutions, particularly in individual rooms of healthcare facilities, such as hospitals, hospices, and nursing homes. Data capabilities, including interactive functions, are frequently added to the displays. A user commonly controls an infotainment display in, for example, a hospital, using a device termed a "pillow speaker," which includes sound reproduction and control abilities. The control abilities may include powering the display on and off, changing channel and volume, and, for data-capabilities, entering interactive information.

The pillow speaker is commonly coupled to the infotainment display by a cable. The number of wires in the cable may vary among different infotainment displays depending, for example, on the manufacturer of the display. The cables generally do not include dedicated power signals, but they commonly supply limited power levels combined with other signals, for example, data control signals. To avoid use of an additional power source, the pillow speaker is limited to a low power consumption level. Increasing interactive capabilities are generally desired without increased power consumption.

The signaling protocol for controlling the display may vary among displays. Furthermore, the user interface on the pillow speaker may vary with the capabilities of the display and with the abilities of the user. The many combinations of display protocols, display capabilities, and user abilities may be difficult for a manufacturer of pillow speakers to supply.

SUMMARY

Accordingly, there is a need for a control device, preferably embodied in or configured as a pillow speaker, that provides control signals for an audio-visual display using flexible protocols, that has a configurable user interface, and that operates with a low level of power consumption.

In one aspect, a device and/or system for controlling a display in accordance with an exemplary embodiment of this disclosure may be broadly characterized as including a touch panel configured to sense inputs from a user: and a processor coupled to the touch panel and configured to transmit control signals to the audio-visual display based on the sensed inputs, wherein the control device receives power from the audio-visual display via wiring and the control signals are transmitted over the wiring.

In another aspect, a method for operating control device for an audio-visual display in accordance with an exemplary embodiment of this disclosure may be broadly characterized by sampling an x-axis location of a user input on a touch panel; sampling a y-axis location of the user input on the touch panel; determining a command corresponding to the sampled x-axis and y-axis locations; and transmitting a control signal for the determined command to the audio-visual display.

In another aspect, a method for calibrating operation of a control device having a touch panel in accordance with an exemplary embodiment of this disclosure may be broadly characterized by taking an x-axis sample with initial x-axis sampling characteristics; determining, using the x-axis sample, x-axis sampling characteristics to provide a desired performance; taking an y-axis sample with initial y-axis sampling characteristics; and determining, using the y-axis sample, y-axis sampling characteristics to provide a desired performance.

DETAILED DESCRIPTION

Figure 1:
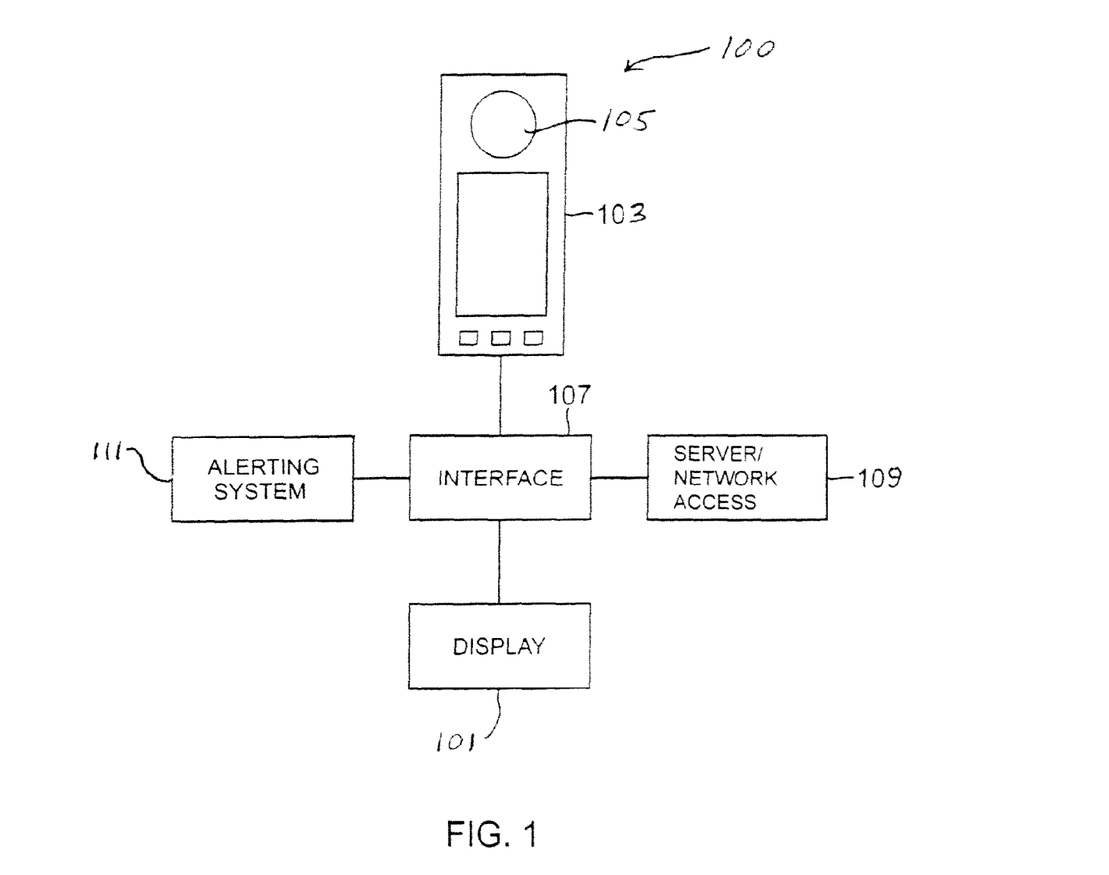
FIG. 1 is a block diagram of an audio-visual display system employing a control device in accordance with aspects of the disclosure.

FIG. 1 is a block diagram of an audio-visual "infotainment" system 100 in accordance with aspects of the disclosure. The infotainment system includes a display 101 (such as a television) for presentation of video, audio, images, graphics, and the like to a user. The user controls the display using a control module or device 103, which may be incorporated into, or configured as, a pillow speaker. The control device 103 commonly includes a speaker 105 for reproduction of audio associated with the display 101. The control device 103 also transmits user command signals to the display 101. In some embodiments, the control device 103 also receives signals, for example, firmware or configuration information. For example, the user may use the control device 103 to select a television channel for presentation on the display 101.

The control device 103, in the embodiment illustrated in FIG. 1, is coupled to the display 101 by way of an interface module 107. In other embodiments, the control device 103 may be coupled directly to the display 101. The interface module 107, if employed, may be coupled to a server/network access device 109. The server/network access device 109 may provide local and wide-area connectivity including Internet access. The server/network access device 109 may, for example, provide on-line data services as selected by the user by means of the control device 103. The server/network access device 109 may be, for example, a computer or a communications device, such as a router. As shown in the embodiment of FIG. 1, the interface module 107 may also be coupled to an alarm or alerting system 111. The alerting system 111, if employed, allows the user to summon assistance, for example, by activating a "nurse call" button on the control device 103. Some embodiments may include additional components such as a VCR or DVD player with the additional components also controlled by the control device 103. Additionally, functions of the various devices may be distributed or combined in various ways.

Figure 2:
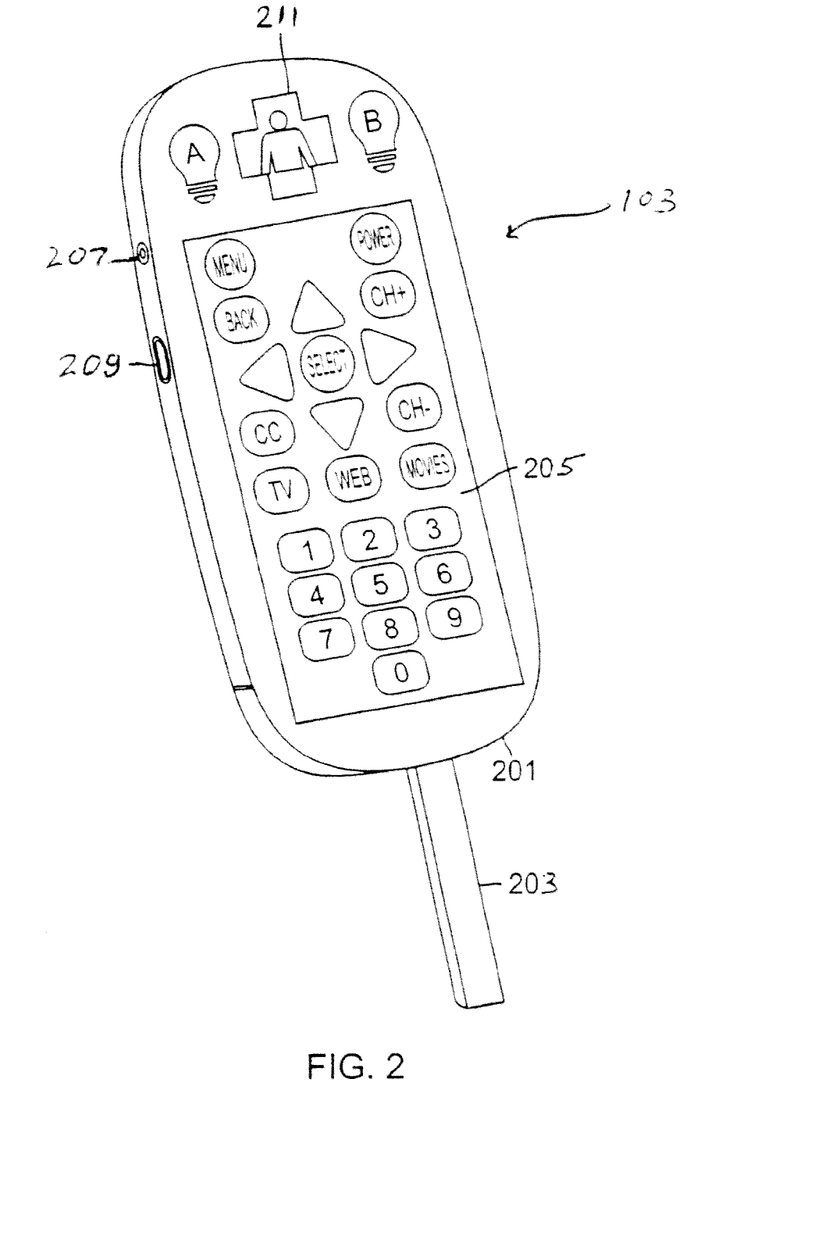
FIG. 2 is a perspective view of one embodiment of an audio-visual display control device in accordance with aspects of the disclosure.

FIG. 2 is a perspective view of a control device 103 in accordance with aspects of the disclosure. The control device 103 includes a hand-held housing or enclosure 201 that may advantageously be configured as a television remote control or as a pillow speaker. The control device 103 may advantageously be coupled to the display 101 (FIG. 1) by means of a cable 203 for the transmission of control signals to the display 101. If the control device 103 is embodied in or configured as a pillow speaker, the housing 201 would have a speaker opening (not shown), and the cable 203 would transmit audio signals from the display 101 to a speaker (not shown) inside the housing adjacent the speaker opening. A touch panel 205 for receiving user inputs is located on a surface of the housing 201. The touch panel 205 responds electrically to contact with its surface. It may generate an electrical output control signal in response to, for example, changes in capacitance or resistance, as is well known in the art. Embodiments may use printed graphics on or under the touch panel 205 to identify control functions activated by corresponding areas of the touch panel 205. Other embodiments use a touch-screen display for user input. The touch-screen display may be, for example, a liquid crystal display, an organic light emitting diode display, an electrophoretic display, or a micro-electromechanical display. An audio jack 207 may used to connect, for example, headphones to the control device. A universal serial bus (USB) port 209 may be included in the control device to provide a connection to other devices. In addition to the touch panel 205, the control device 103 may include input buttons 211 for dedicated functions, such as a nurse call.

The control functions selectable by the user of the control device 103 may be dynamically configured. The control functions may be configured depending on an operating modality of the control device 103. For example, different control functions may be available when the user is watching a television program and when the user is watching a recorded video, respectively. The available control functions may be presented on a touch-screen display of the control device 103. The selected control functions that are to be displayed may be signaled to the control device 103, for example, by way of the server/network access device 109 of FIG. 1. Various display configurations may be stored in the control device 103, and a selection of what configuration to display received by the control device 103. Alternatively, the control device 103 may receive signaling that fully or partially indicates what control functions to display to the user.

Figure 3A:
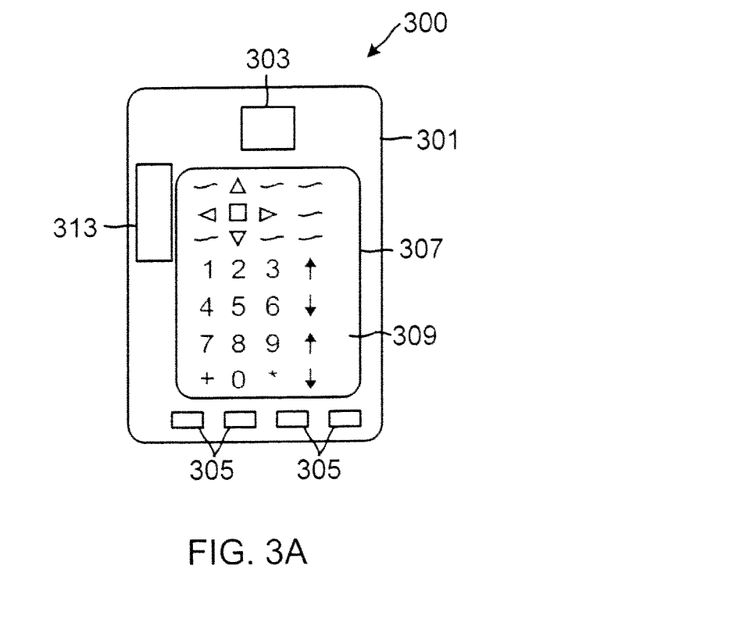
FIGS. 3A and 3B are semi-diagrammatic views of an audio-visual display control device in accordance with aspects of the disclosure.
Figure 3B:
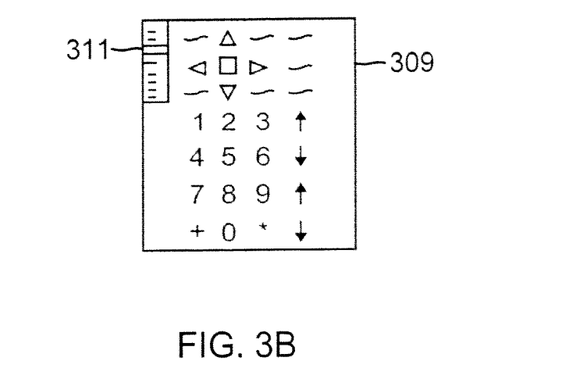

FIGS. 3A and 3B illustrate a control device 300 embodied in or configured as a pillow speaker, in accordance with aspects of the disclosure. The control device includes an enclosure or housing 301 that houses a speaker 303 to supply audio to a user. One or more buttons 305 may also be included in the enclosure 301 to signal requests from a user, such as requesting assistance or switching lighting off or on. A touch panel 307 is included on a surface of the enclosure 301. The touch panel 307 is of a conventional type that is electrically sensitive to pressure or proximity, and it is used to sense inputs from the user. The touch panel 307 is transparent, in one embodiment, so that an underlay 309, which may be disposed underneath the touch panel 307, is visible through the touch panel 307. The underlay 309 is illustrated in FIG. 3A in position beneath the touch panel 307 and illustrated separately in FIG. 3B. The underlay 309 has markings for possible user commands. The markings serve as visual indicia of the commands. When the user presses the touch panel 307 at a location above one of the markings, the control device signals a command associated with the marking to an attached system. Underlays having different markings may be used with the control device, thereby to provide virtual buttons corresponding to the different markings.

An identifier 311 (FIG. 3B), in one embodiment, is included on the underlay 309, with an identity reader 313 (FIG. 3A) provided at a corresponding location of the enclosure 301. In one embodiment, the identifier 311 is a barcode, and the identity reader 313 is a barcode reader. The identifier 311 is read or sensed by the identity reader 313 to configure operation of the control device. More specifically, a particular arrangement and/or combination of virtual buttons is associated with each identifier 311. The identifier 311 may signal additional information such as a communication protocol for the control device to use.

Figure 4A:
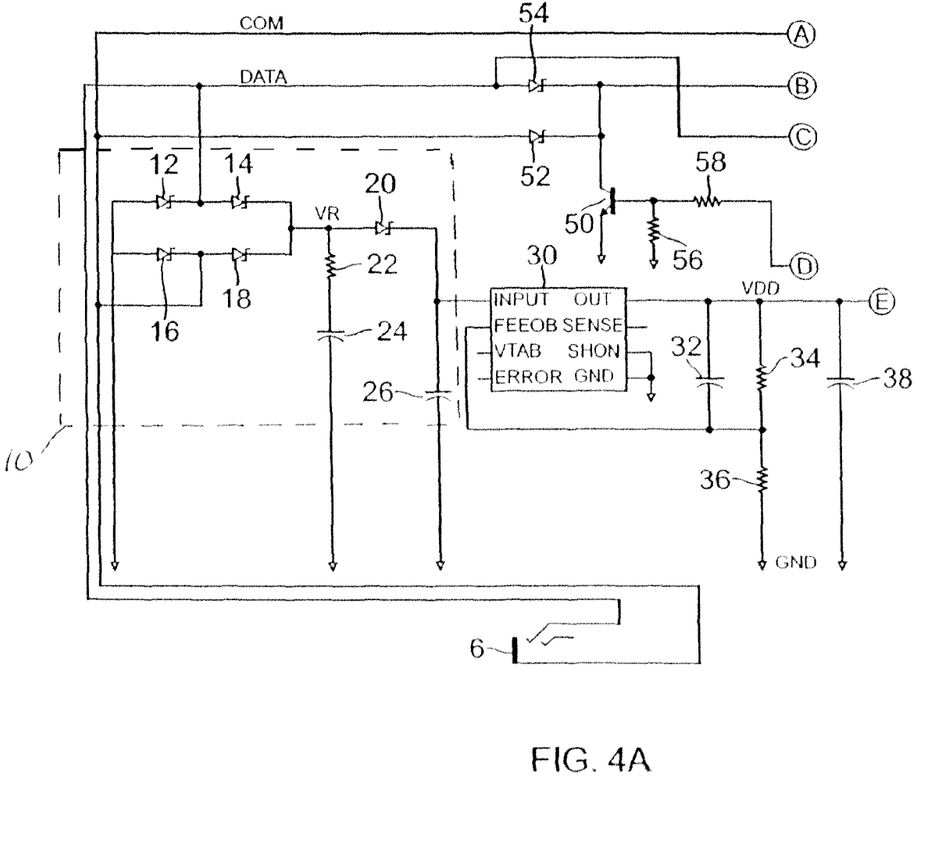
FIGS. 4A and 4B are partial schematic diagrams of exemplary electronic circuitry that may be employed in an audio-visual display control device in accordance with aspects of the disclosure.
Figure 4B:
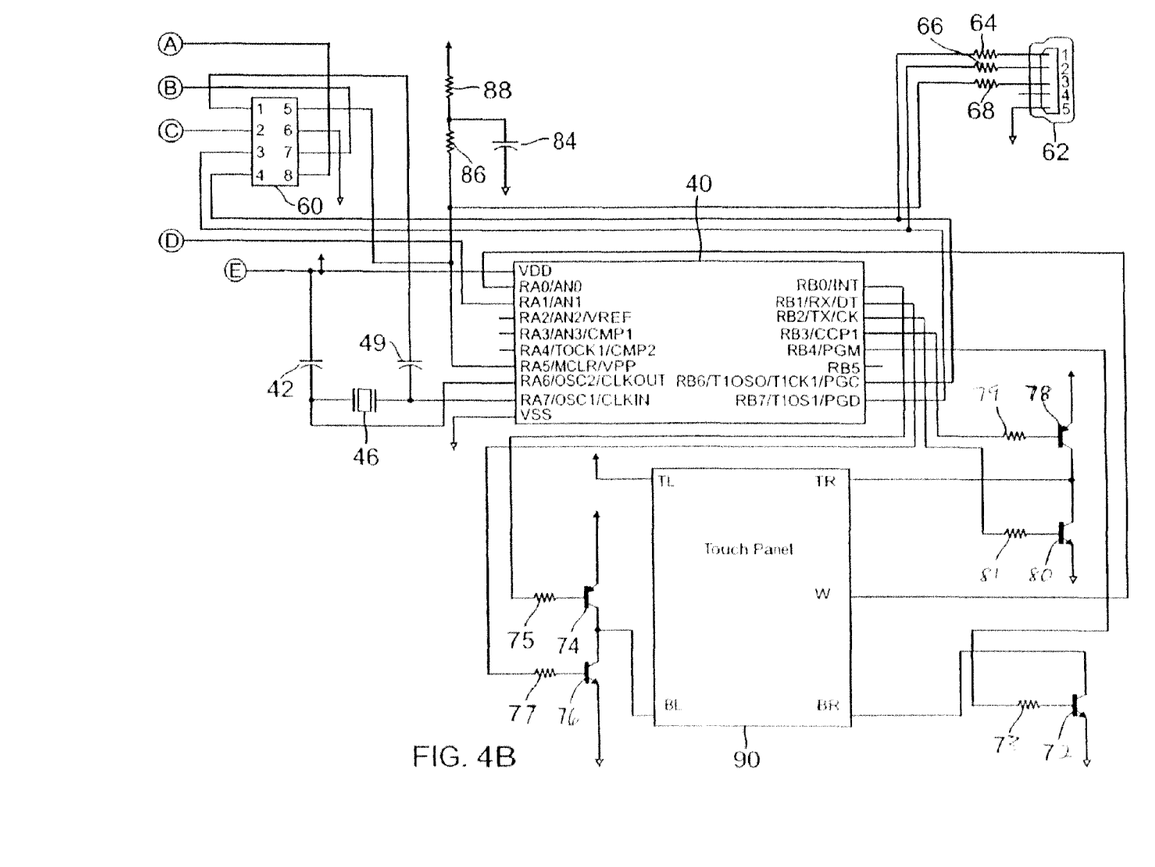

FIGS. 4A and 4B constitute a partial schematic diagram of exemplary circuitry for a control device in accordance with aspects of the disclosure. A microcontroller 40 (FIG. 4B) provides control of the control device based on program instructions. The instructions may be stored in a nonvolatile memory, such as a flash memory (not shown), which may be an integral component of the microcontroller 40. In some embodiments, and as illustrated in FIG. 4B, the microcontroller 40 may be a model PIC16F1826 microcontroller manufactured by Microchip Technology Inc., or a comparable device.

The microcontroller 40 is powered by a supply voltage VDD output from a voltage regulator 30 (FIG. 4A). The power supply voltage VDD preferably has a low operating level, for example, 2.2 volts. In some embodiments, the voltage regulator 30 may be a model LP2951ACM manufactured, for example, by National Semiconductor Corp., or an equivalent. The level of the output voltage VDD of the voltage regulator 30 may advantageously be established by a first regulation resistor 34 and a second regulation resistor 36. A first filter capacitor 32 and a second filter capacitor 38 may be used to reduce noise in the power supply voltage VDD. Multiple capacitors coupled in parallel may be used for the filter capacitors. For example, an embodiment may include a small valued capacitor coupled with a large value capacitor to provide noise filtering at high and low frequencies. In embodiments with other voltage regulators, the associated passive components may be modified according to the specifics of the voltage regulator.

An energy harvesting circuit 10 (FIG. 4A) supplies a voltage signal to the voltage regulator 30. The energy harvesting circuit 10 draws power from a data signal DATA and common signal COM. The signals may be coupled to the control device via a jack 6. Embodiments may couple the circuitry to an external device by way of cables with varying signal locations. Connecting the signals in the cable to signals of the control device circuitry may be performed using a wiring section with, for example, solderable connections. The data signal DATA and common signal COM may be coupled to a display device or an interface module as described above with reference to FIG. 1. The common signal COM provides a reference level. The data signal DATA is used for control signaling from the control device and to supply power to it. Power is supplied with a high impedance and signaling is performed by presenting a low impedance between the data signal DATA and the common signal COM. The voltage level supplied on the data signal DATA may vary in polarity and magnitude depending on the display device to which the control device is coupled.

The energy harvesting circuit 10, in one embodiment, includes a first diode 12, a second diode 14, a third diode 16, and a fourth diode 18 that are coupled in a diode bridge network to rectify the voltage between the data signal DATA and the common signal COM. The output of the diode bridge network is a rectified voltage VR relative to a ground signal GND. The diodes 12, 14, 16, and 18 may be Schottky diodes to reduce power dissipation. In the illustrated embodiment, a rectifier capacitor 24 is coupled between the rectified voltage VR and the ground signal GND to store charge for supplying the voltage regulator 30 during control signaling, which substantially shorts the data signal DATA and the common signal COM. In the embodiment of FIGS. 4A and 4B, a limiting resistor 22 is coupled in series with the rectifier capacitor 24 to limit current charging the rectifier capacitor 24. The limiting resistor 22 aids in avoiding or at least minimizing unintended signaling that may be caused by a high charging current. A fifth diode 20 advantageously couples the rectified voltage VR to the voltage regulator 30. The fifth diode 20 may also be a Schottky diode. A second capacitor 26 may be employed to bypass the input to the voltage regulator 30 to the ground signal GND.

An output transistor 50 (FIG. 4A) is employed in the illustrated embodiment to provide output signaling by conditionally presenting a low impedance between the data signal DATA and the common signal COM. The output transistor 50, in the illustrated embodiment, is an NPN bipolar junction transistor, with an emitter coupled to the ground signal GND and a collector diode-coupled to the data signal DATA and the common signal COM. Coupling of the collector to the data signal DATA is via a first output diode 54, and coupling of the collector to the common signal COM is via a second output diode 52. In some embodiments, the diodes are Schottky diodes. A base of the output transistor 50 may be coupled to the ground signal GND through a first biasing resistor 56 and to the microcontroller 40 through a second biasing resistor 58. When the microcontroller 40 supplies a low signal level to the output transistor 50, the transistor is substantially off and does not present a substantial load between the data signal DATA and the common signal COM. When the microcontroller 40 supplies a high signal level to the output transistor 50, the transistor is substantially on and presents a substantial load between the data signal DATA and the common signal COM. The particular current path depends on the voltage levels. When the data signal DATA is a positive voltage relative to the common signal COM, signaling current flows from the data signal DATA to the common signal COM via the first output diode 54, the output transistor 50, and the third diode 16 of the diode bridge. When the data signal DATA is a negative voltage relative to the common signal COM, signaling current flows from the common signal COM to the data signal DATA via the second output diode 52, the output transistor 50, and the first diode 12 of the diode bridge. The microcontroller 40 switches the output transistor 50 on and off in a pulse train that varies in timing and in sequence depending on the command being signaled and the protocol of the equipment receiving the command.

Referring to FIG. 4B, the microcontroller 40 may operate with a clock signal generated using an integrated oscillator circuit. The frequency of the clock signal is established using a crystal 46 having two terminals coupled to the microcontroller 40. A first crystal capacitor 42 and a second crystal capacitor 49 are coupled between the terminals of the crystal 46 and the supply voltage VDD to additionally establish the frequency of the clock signal. In some embodiments, some or all of the oscillator components including the crystal 46, the first crystal capacitor 42, and the second crystal capacitor 49 or their equivalents may be integrated with the microcontroller 40.

The microcontroller 40 may receive a reset signal via an RC-network formed by a reset capacitor 84, a first reset resistor 88, and a second reset resistor 86. The RC-network creates a reset signal that is de-asserted following a delay interval after the power signal VDD is at its operating level. The reset may also be signaled from a diagnostic connector 60.

The microcontroller 40 may be coupled to a universal serial bus (USB) connector 62. A USB power signal is coupled from the connector 62 via a first port resistor 64 to the reset signal. The microcontroller 40 is coupled to the USB data signals via a second port resistor 66 and a third port resistor 68. Signaling for the USB signals may be supplied and received by specialized circuitry in the microcontroller 40, by program (software or firmware) control, or by a combination thereof.

A touch panel 90 is coupled to the microcontroller 40 for sensing user actions. The touch panel 90 may be a five-wire resistive panel as shown in FIG. 4B. The touch panel 90 has a top-left terminal TL, a top-right terminal TR, a bottom-left terminal BL, a bottom-right terminal BR, and a wiper terminal W. Generally speaking, location of a pressure or touch point on the touch panel 90 is found by placing a positive voltage level on the left terminal TL and the top-right terminal TR, and by placing a ground level on the bottom-left terminal BL and the bottom-right terminal BR. The voltage level would be measured on the wiper terminal W to determine the location in a top-bottom direction. Similarly, the location in a left-right direction is found by placing a positive voltage level on the left terminal TL and the bottom-left terminal BL, and a ground level on the top-right terminal TR and the bottom-right terminal BR, and then measuring the voltage level on the wiper terminal W.

Accordingly, the wiper terminal W is coupled to an analog-to-digital converter, which, in the embodiment of FIGS. 4A and 4B, is integrated in the microcontroller 40 (and is therefore not separately shown), but which may be a discrete component. The top-left terminal TL is coupled to the power supply voltage VDD. The bottom-right terminal BR is switched to the ground signal GND by a first switching transistor 72 for determining each of the left-right and top-bottom locations. The first switching transistor 72 is advantageously controlled by the microcontroller 40 via a first control resistor 73. The bottom-left terminal BL is coupled to the power supply voltage VDD for determining the left-right location and to the ground signal GND for determining the top-bottom location. A second switching transistor 74 switches the bottom-left terminal BL to the power supply VDD and is advantageously controlled by the microcontroller 40 via a second control resistor 75. A third switching transistor 76 switches the bottom-left terminal BL to the ground signal GND and is advantageously controlled by the microcontroller 40 via a third control resistor 77. The top-right terminal TR is coupled to the power supply voltage VDD for determining the top-bottom location, and to the ground signal GND for determining the left-right location. A fourth switching transistor 78 switches the top-right terminal TR to the power supply voltage VDD and is advantageously controlled by the microcontroller 40 via a fourth control resistor 79. A fifth switching transistor 80 switches the top-right terminal TR to the ground signal GND and is advantageously controlled by the microcontroller 40 via a fifth control resistor 81. As shown in the exemplary embodiment of FIGS. 4A and 4B, the first switching transistor 72, the third switching transistor 76, and the fifth switching transistor 80 may be NPN bipolar junction transistors, while the second switching transistor 74 and the fourth switching transistor 78 may be PNP bipolar junction transistors. By switching the terminals of the touch panel 90 to the power supply voltage VDD or the ground signal GND only when actively sensing a location, power savings are achieved.

Figure 5:
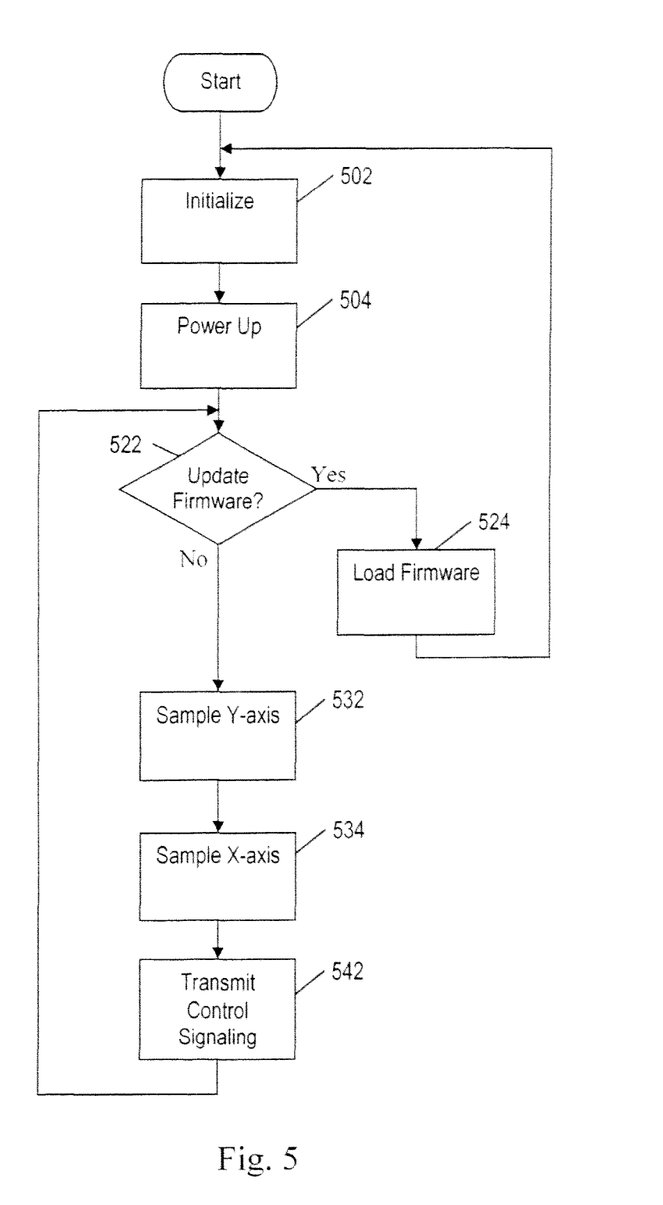
FIG. 5 is a flowchart of a process for controlling a display in accordance with aspects of the disclosure.

FIG. 5 is flowchart for a control device signaling process in accordance with aspects of the disclosure. The process may be performed by hardware, software, or a combination thereof. For example, the process may be performed by the exemplary circuitry of FIGS. 4A and 4B, utilizing program instructions executed by the microcontroller 40.

The process initializes operation in step 502. Initialization configures hardware of the control device for use. Examples of initialization include configuring a clocking scheme, global variables, input/output ports, timers and counters, and an analog-to-digital converter.

In step 504, the process powers up the control device for active operation. The power up operation may be performed slowly, for example, to avoid unintended signaling that may result from a large current draw from a shared power-data connection. The process may use a power-on reset circuit (not shown) to time the power-up step.

In step 522, the process determines whether firmware in the control device should be updated. The firmware may, for example, include program instructions used to implement the process or parameters used by a control device associated with the process. The firmware may alternatively or additionally include graphic information, for example, information or a selection of information to be displayed on the control device. In some embodiments, the determination to update firmware is based on the control device being connected to a docking device or station. The determination may also be based on detection of a separate device containing firmware, for example, a device connected to a USB port on the control device. The determination may also be based on control signaling received by the control device. If firmware is to be updated, the process continues to step 524; otherwise, the process continues to step 532.

In step 524, the process loads firmware. The firmware may be loaded from a memory file, for example, a hex file, in a device connected to a USB port of control device. In other embodiments, the process may load firmware via an Internet, intranet, or server connection. The firmware may be stored in a nonvolatile memory or, for example, for graphic information in a dynamic memory. The process thereafter returns to step 502. In another embodiment, the process continues to step 532.

In step 532, the process samples for a Y-axis location of a user input on a touch panel. The rate that the process samples for a Y-axis location and the duration of the sampling may be selected to provide a desired performance tradeoff between sensitivity and power consumption with higher rates and durations providing increased sensitivity and increased power consumption. In embodiments of the process using touch panel circuitry as illustrated in FIGS. 4A and 4B, sampling for a Y-axis location includes driving a top-left terminal and a top-right terminal high, driving a bottom-left terminal and a bottom-right terminal low, and reading an analog voltage at a wiper terminal.

In step 534, the process samples for an X-axis location of a user input on a touch panel. The rate and duration that the process samples for an X-axis location may also be selected to provide a desired performance tradeoff between sensitivity and power consumption. The rates and durations of sampling may differ between steps 532 and 534. In embodiments of the process using touch panel circuitry as illustrated in FIGS. 4A and 4B, sampling for an X-axis location includes driving the top-left terminal and the bottom-left terminal high, driving the top-right terminal and the bottom-right terminal low, and reading an analog voltage at the wiper terminal.

In step 542, the process generates a control signal. The control signal is based on the locations sampled in steps 532 and 534. The process maps the locations to a command. For example, the process may look up the X-axis and Y-axis locations in a stored look-up table (which may be in nonvolatile memory included in the microcontroller 40 or in a discrete memory device) to determine the appropriate command. Additionally, the command may vary with a configuration of the control device. For example, an identifier as shown in FIG. 3 may indicate what commands are associated with specific X-axis and Y-axis locations.

The command is signaled using a communication protocol accepted by the device being signaled. The command signaled may be a null command having no signaling, for example, when no location of a user input is sampled in steps 532 and 534. The protocol may be stored in a table in the control device, for example, in nonvolatile memory included in the microcontroller 40 or in a discrete memory device. In some embodiments, multiple protocols, such as a separate protocol for each of various devices that may be signaled by the control device, are signaled for each command. The protocols may be loaded for use by the process in the same manner as firmware is loaded by the process. The process then returns to step 522. In another embodiment, the process returns to step 532.

Figure 6:
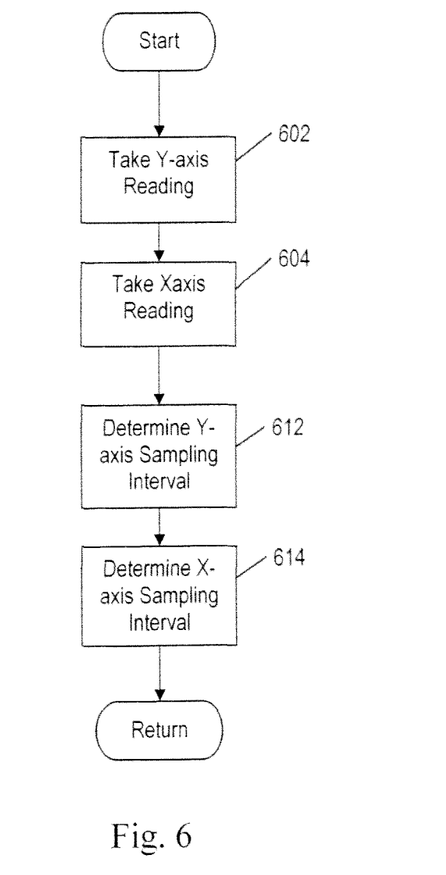
FIG. 6 is a flowchart of a process for calibrating a control device touch panel in accordance with aspects of the disclosure.

FIG. 6 is a flowchart of a process for calibrating a touch panel in accordance with aspects of the disclosure. The calibration process may be performed by hardware, software, or a combination thereof. In one embodiment, the calibration process is performed each time the control device is initialized. In another embodiment, the process is performed when the control device is manufactured, with calibration results from the process stored for use during operation of the control device. In still another embodiment, the process is performed when the control device is designed, with calibration results from the process used during the manufacturing process.

In step 602, the process takes an initial Y-axis reading of a touch panel. The reading is taken using initial sampling characteristics, for example, 20 percent sampling duration and 100 μs sampling interval. In step 604, the process takes an initial X-axis reading of a touch panel. The reading is taken using sampling characteristics that may be the same as those used in step 602 for the initial Y-axis reading, or they may be different.

In step 612, the process determines Y-Axis sampling characteristics that provide a desired tradeoff between touch performance and power consumption. In step 614, the process determines X-Axis sampling characteristics that provide a desired tradeoff between touch performance and power consumption. In one embodiment, the sampling durations are incrementally decreased until touch performance drops below a desired level. In another embodiment, the sampling durations are incrementally increased until power consumption exceeds a desired level. The process, in still other embodiments, may search for sampling characteristics that optimize combined touch performance and power consumption. The calibration process may additionally determine sampling intervals to further achieve the desired tradeoff between touch performance and power consumption.

The power consumption impact when the sampling durations are changed may be further understood by the following example: In an embodiment with a 2.2 V power supply voltage and a touch panel drive impedance of 80Ω, the power required to drive the panel is approximately 60 mW. When the sampling duration is 20%, the average power dissipation is approximately 12 mW; when the sampling duration is 2%, the average power dissipation is approximately 1.2 mW.

Although this disclosure has described various embodiments, it should be recognized that a number of variations and modifications of these embodiments may suggest themselves to those skilled in the pertinent arts. Thus, the specific embodiments disclosed herein are considered exemplary only, and not limiting.

What is claimed is:

1. A control device for an audio-visual display, comprising:
   a touch panel configured to sense inputs from a user;
   a processor coupled to the touch panel and configured to transmit control signals to the audio-visual display based on the sensed inputs, wherein the control device receives power from the audio-visual display via wiring, and wherein the control signals are transmitted over the wiring; and
   an energy harvesting circuit configured to receive the power from the audio-visual display and produce a voltage signal for operation of the control device.

2. The control device of claim 1, wherein the touch panel is transparent.

3. The control device of claim 2, further comprising an underlay disposed under the touch panel, the underlay including indicia of commands selectable by the user.

4. The control device of claim 3, wherein the underlay further includes an identifier indicative of a spatial arrangement of the indicia of commands, and wherein the control device further comprises means for reading the identifier.

5. The control device of claim 4, wherein the control signals are further based on the identifier.

6. The control device of claim 5, wherein the processor is further configured to control the touch panel by sensing x-axis and y-axis locations of the inputs from the user.

7. The control device of claim 6, wherein the transmitted control signals correspond to commands associated with the indicia at the x-axis and y-axis locations.

8. The control device of claim 1, wherein the touch panel comprises a liquid crystal display.

9. The control device of claim 1, further comprising a speaker configured to produce sounds corresponding to an audio signal received from the audio-visual display.

10. The control device of claim 1, wherein the energy harvesting circuit receives the power using a data signal and a common signal.

11. The control device of claim 10, wherein the energy harvesting circuit comprises a Schottky diode bridge coupled to the data signal and the common signal.

12. The control device of claim 10, wherein the control signals are transmitted by selectively presenting a low impedance between the data signal and the common signal.

* * * * *